Aug. 14, 1951     M. J. KITTLER     2,564,112
VALVE MECHANISM FOR HEATING CONTROLS
Filed Jan. 23, 1947
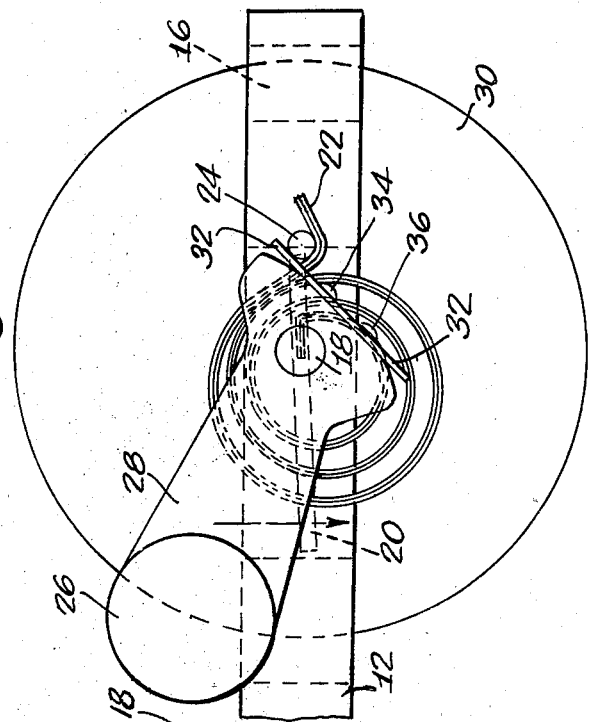
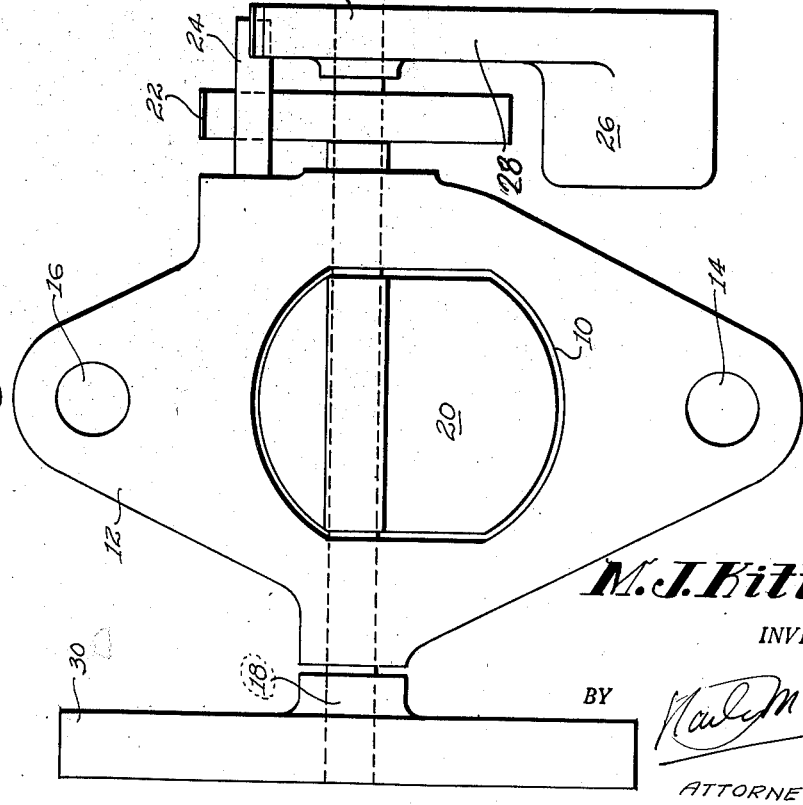
M. J. Kittler
INVENTOR.

Patented Aug. 14, 1951

2,564,112

UNITED STATES PATENT OFFICE 2,564,112

VALVE MECHANISM FOR HEATING CONTROLS

Milton J. Kittler, Detroit, Mich., assignor to George M. Holley and Earl Holley

Application January 23, 1947, Serial No. 723,815

2 Claims. (Cl. 251—126)

The object of this invention is to prevent the heat control valve of an automobile engine from creating objectionable noise when the valve closes.

A valve of this type is eccentrically mounted, is opened by exhaust pressure and is closed by a spring. The spring usually being made of a thermostatic bi-metal material. The valve is also opened by gravity. A weighted pendulum is arranged to open the valve. Hence, when the exhaust pressure is reduced, that is when the throttle is closed, the spring causes the valve to close suddenly and an objectionable noise is created by the inertia of the weight. This weight, which opens the valve, is resisted by the spring when the engine is cold.

Fig. 1 shows the elevation of the valve, the exhaust gases flowing in the direction of the arrow.

Fig. 2 shows a top plan view.

In the figures, 10 is the opening through the casting 12. This casting 12 is provided with openings 14 and 16 so that it can be bolted into and inserted in the exhaust pipe. 18 is the shaft upon which is mounted the eccentric valve 20. The thermostatic spring 22 has a one-way connection with the pin 24 and is connected to the shaft 18 in a well known manner. When the valve 20 is pushed to the open position, by the exhaust pressure acting in the opening 10, the shaft 18 rotates anti-clockwise. A weight 26 also moves anti-clockwise, the weight 26 being mounted like a pendulum on the end of the arm 28 which is keyed to the shaft 18.

A fly-wheel 30 may be provided so that the frequency of the vibrations of the shaft 18 can be held down to a minimum.

On the upper end of the arm 28 is mounted a spring 32. This spring 32 is riveted in the center by two rivets 34 and 36. Hence, the spring 32 is a cantilever spring held in the middle. The arm 28 is relieved so that the cantilever spring 32 can be flexed and as it deflects the length of the cantilever diminishes. The stiffness of this spring 32 increases inversely as the cube of its length. Hence, the spring becomes progressively stiffer as the valve 20 swings back to its closed position when the spring 32 engages the stop 24. The load therefore, bringing the valve 20 to a standstill, increases rapidly as the spring 32 is deflected.

In hot weather and when the valve 20 is wide open, that is when the thermostatic spring 22 offers insufficient resistance to the exhaust pressure and the weight 26 pulls the valve 20 wide open then the other end of the cantilever spring 32 strikes the stationary pin 24 on the other side and again the impact of the spring 32 on the pin 24 occurs without any sharp note or noise.

The reason for this is that the spring 32, when engaging with the pin 24, automatically reduces the length of the cantilever spring and hence the spring rapidly increases in stiffness and thus brings the mechanism to rest and absorbs the resulting shock by spreading it over an appreciable interval of time.

What I claim is:

1. An exhaust pipe control comprising a casing having a passage therethrough and a rock shaft pivotally mounted eccentrically thereof and a valve mounted on said shaft eccentrically thereof adapted to be opened by the flow of exhaust gases, a thermostatic spring urging the rock shaft to valve closing position when cool, an arm carried by the rock shaft, a stop on said casing, a cantilever bumper spring mounted on said arm and engaging with said stop in the valve closing direction, said arm being curved so that the length of the cantilever is reduced when the spring is deflected, said bumper spring forming a second similar cantilever bumper on said arm also adapted to engage with said stop, said spring serving to absorb the shock when the valve is opened wide by the flow of exhaust gases.

2. A heat control valve for an engine exhaust having a casing provided with a passage therethrough and a valve pivotally mounted eccentrically of said passage, thermostatic means exposed to the heat of the exhaust gases and formed of a resilient material for closing the valve when cool, said valve being responsive to the flow of the exhaust gases past the valve tending to open the valve, a weighted lever on said valve tending to open said valve, a valve silencing means comprising a stop on said casing, a curved support formed on an arm of the weighted lever, a flat spring mounted on said curved support so as to form a cantilever so that the effective length of the spring is reduced and the motion of the valve is brought to a standstill gradually whenever the end of the flat spring cantilever engages the stop during the motion of the valve towards its closed position responsive to the resiliency of the thermostatic means, said flat spring forming a similar cantilever bumper mounted on a similar curved portion of said support to engage said stop so that the motion of the valve towards its open position is also checked gradually.

MILTON J. KITTLER.

REFERENCES CITED

The following references are of record in the file of this patent:

UNITED STATES PATENTS

| Number | Name | Date |
|---|---|---|
| 1,317,268 | Cole | Sept. 30, 1919 |
| 1,998,636 | Porter | Apr. 23, 1935 |
| 2,172,678 | Heftler | Sept. 12, 1939 |
| 2,296,213 | Kretzschmar | Sept. 15, 1942 |
| 2,380,374 | Anderson | July 31, 1945 |

FOREIGN PATENTS

| Number | Country | Date |
|---|---|---|
| 18,549 | Great Britain | Nov. 17, 1890 |